United States Patent [19]
Tucek

[11] 3,727,653
[45] Apr. 17, 1973

[54] TREE CUTTING APPARATUS
[75] Inventor: Frank J. Tucek, Wausau, Wis.
[73] Assignee: Drott Manufacturing Corporation
[22] Filed: Mar. 15, 1971
[21] Appl. No.: 124,244

Related U.S. Application Data
[62] Division of Ser. No. 781,899, Dec. 6, 1968, Pat. No. 3,575,222.

[52] U.S. Cl. ..............................144/34 E, 144/34 R
[51] Int. Cl. ..............................................A01g 23/08
[58] Field of Search ........................83/600; 144/2 Z, 144/3 D, 34 R, 34 E, 309 AC

[56] References Cited

UNITED STATES PATENTS

| | | | |
|---|---|---|---|
| 3,198,225 | 8/1965 | Busch | 144/3 D |
| 2,697,459 | 12/1954 | McFaull | 144/34 E |
| 3,498,350 | 3/1970 | Maradyn | 144/3 D |
| 715,482 | 12/1902 | Kauffman | 30/260 |
| 2,242,476 | 5/1941 | Newman | 30/245 |
| 2,366,909 | 1/1945 | Johnson | 144/34 E |
| 2,930,122 | 3/1960 | Pfundt | 30/228 |

FOREIGN PATENTS OR APPLICATIONS

| | | | |
|---|---|---|---|
| 620,519 | 5/1961 | Canada | 144/2 Z |
| 908,763 | 10/1945 | France | 144/34 E |

Primary Examiner—Gerald A. Dost
Attorney—Molinare, Allegretti, Newitt & Witcoff

[57] ABSTRACT

Apparatus for cutting trees. The apparatus includes a support frame. A first arm is pivotally connected to the upper portion of the frame for engaging one side of a tree. A tree engaging member is fixedly secured to the lower portion of the support frame and includes first and second outwardly extending tree engaging portions. Means are provided for moving the first arm into spaced alignment with the first tree engaging portion. Tree cutting means are connected to the lower portion of the support frame. A second arm is pivotally connected to the support frame intermediate the first arm and the tree engaging member for engaging the other side of the tree. Means are provided for driving the second arm against the other side of the tree and for applying constant pressure thereto before, during, and after cutting the tree so as to maintain the tree under control of the tree cutting apparatus at all times.

5 Claims, 6 Drawing Figures

PATENTED APR 17 1973

Inventor:
Frank J. Tucek

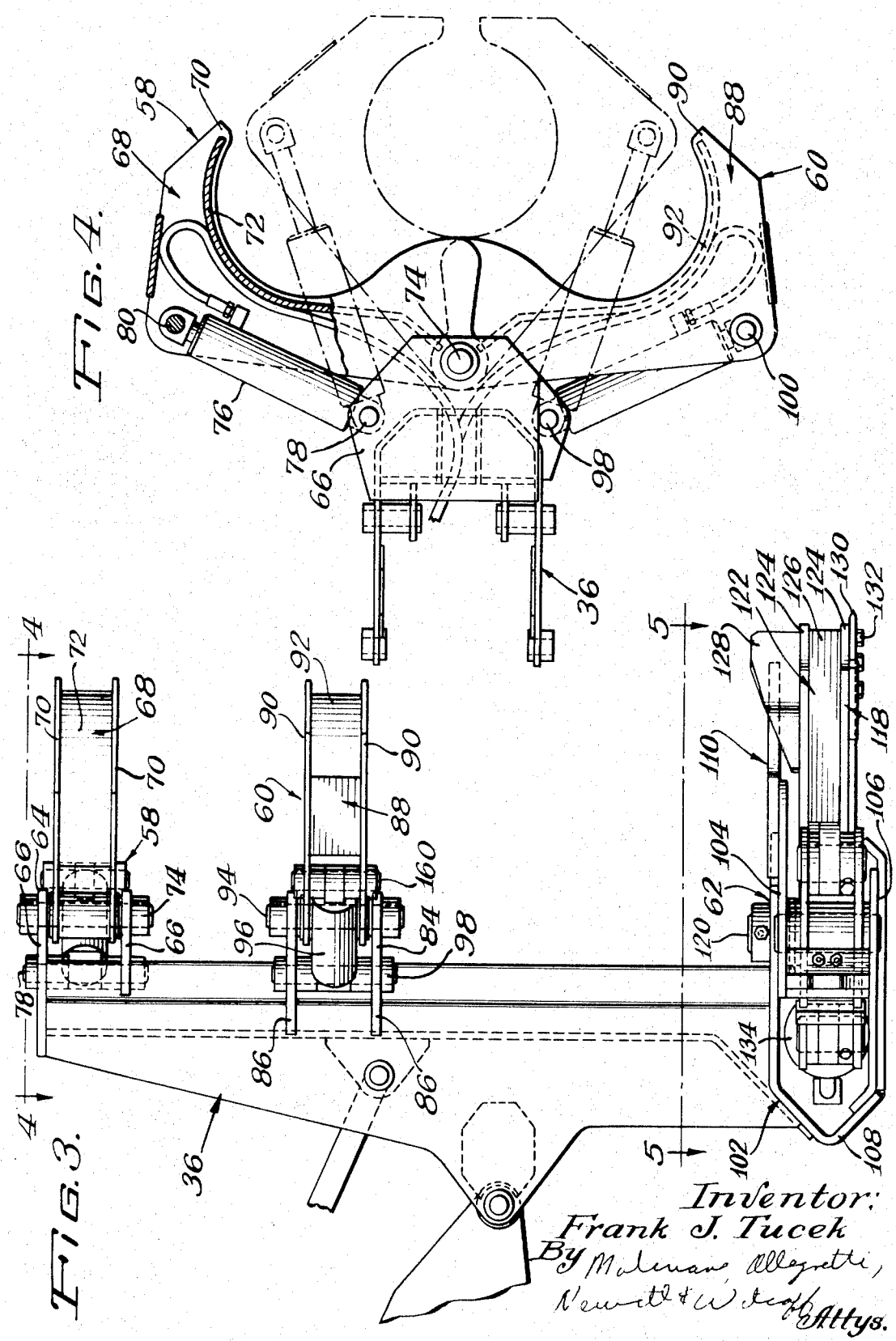

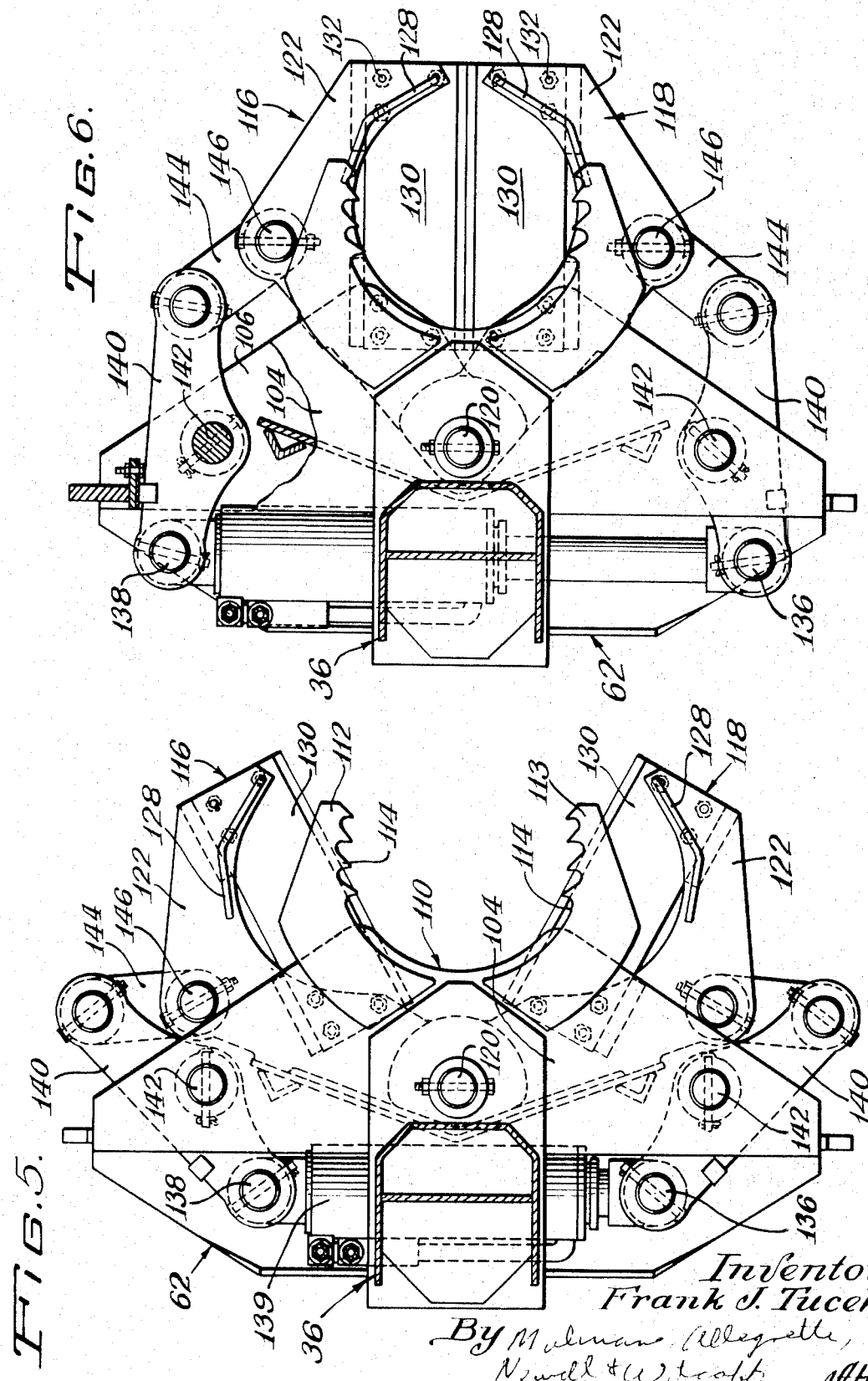

3,727,653

TREE CUTTING APPARATUS

CROSS-REFERENCE TO RELATED APPLICATION

This application is a divisional application of my copending application Ser. No. 781,899, filed Dec. 6, 1968, now U.S. Pat. No. 3,575,222.

BACKGROUND OF THE INVENTION FIELD OF THE INVENTION DESCRIPTION OF THE PRIOR ART

This invention relates to apparatus for cutting trees, and it particularly relates to apparatus for severing trees at their lower ends while maintaining control over the tree before, during and after the cutting has been completed.

In the logging industry, it has been conventional in years past to cut trees down by using conventional hand tools, such as axes and saws. In recent years, various equipment has become available to the logging industry for performing operations on trees which were once done almost exclusively by manual operations. Such equipment has the ability to perform a wide variety of operations including, for example, the delimbing of trees, the topping of trees, cutting of trees, the stacking of trees, the bunching of trees, and the like. Examples of such equipment may be found in U.S. Pat. Nos. 3,102,562; 3,183,954; 3,252,487; 3,277,936; and 3,294,131.

Equipment which is suitable for use in cutting down trees must satisfy a number of requirements. First, the equipment should be able to readily traverse rough, uneven terrain. The equipment should be able to withstand severe weather conditions. Parts which are particularly subject to damage or wear must be readily replaceable. The equipment should be relatively simple and inexpensive both in construction and operation. Although the known prior art equipment may satisfy one or more of the foregoing requirements, it would be highly desirable to improve on the known equipment.

SUMMARY OF THE INVENTION

It is therefore an important object of this invention to provide improved apparatus for severing trees wherein substantially all of the requirements for such apparatus are fulfilled.

It is also an object of this invention to provide improved tree cutting apparatus wherein the operator has positive control over the tree not only before the cutting operation, but also during and after the cutting operation.

It is a further object of this invention to provide tree cutting apparatus which is usable as an attachment for conventional construction equipment such as mobile cranes.

It is still another object of this invention to provide a tree cutting apparatus wherein after the cutting operation, the tree engaging members support the tree in a substantially vertical position so as to enable the operator to readily manipulate and move the severed tree to a desired location with relative ease.

It is yet another object of this invention to provide improved tree cutting apparatus wherein the cutting blades may be readily replaced in a short period of time.

It is still another object of this invention to provide tree cutting apparatus which is particularly characterized by its simplicity and economy in construction, manufacture, and operation and by its efficiency in operation.

It is still another object of this invention to provide tree cutting apparatus which is provided with a pair of vertically spaced tree engaging arms and lower tree cutting shears, all of which are operated by hydraulic drive cylinder and piston arrangements.

Further purposes and objects of this invention will appear as the specification proceeds.

All of the foregoing objects are provided by my apparatus for cutting trees wherein the apparatus includes a support frame, a first arm which is movably connected to the upper portion of the frame for engaging one side of the tree, a tree engaging member is fixedly connected to the lower portion of the support frame and has first and second outwardly extending tree engaging portions, means are provided for moving the first arm into spaced alignment above the first tree engaging portion, tree cutting means are operatively connected to the lower portion of the support frame, a second arm is movably connected to the support frame intermediate the first arm and the tree engaging member for engaging the other side of the tree, means are provided for driving the second arm against the other side of the tree, the driving means applying constant pressure to the said other side of the tree before, during, and after cutting the tree so as to maintain the tree under constant control of the tree cutting apparatus.

BRIEF DESCRIPTION OF THE DRAWINGS

A particular embodiment of the present invention is illustrated in the accompanying drawings wherein:

FIG. 3 is a side elevational view of my tree cutting apparatus wherein the tree holding arms and the shear blades are in the open position;

FIG. 4 is a top plan view of the tree cutting apparatus of FIG. 1 taken along the line 4—4 of FIG. 3;

FIG. 5 is a cross-sectional view taken along the line 5—5 of FIG. 4 showing the lower portion of the tree cutting apparatus, with the shears in the open position; and FIG. 6 is a cross-sectional view, similar to FIG. 5, except the tree cutting shears are shown in the closed position.

DESCRIPTION OF THE PREFERRED EMBODIMENT

Figure 1:
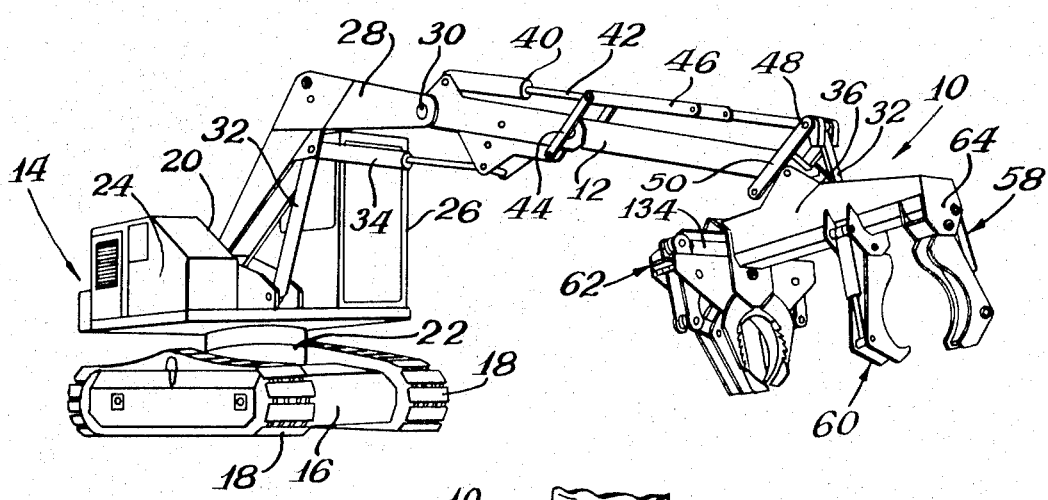
FIG. 1 is a perspective view of my tree cutting apparatus mounted on a mobile crane.

Referring to FIG. 1, my improved tree feller, generally 10, is shown operatively connected to the dipper stick 12 of a mobile crane, generally 14.

The crane 14 is of conventional construction and includes an undercarriage 16 having a pair of tracks 18 for traversing rough and uneven terrain. The overhead assembly generally 20 is pivotally carried about a vertical axis on the undercarriage 16 by a turntable 22. A power unit 24 is mounted on the overhead assembly as is the cab 26 for an operator. The unit 24 is a gasoline engine or diesel engine which operates various hydraulic cylinders and hydraulic motors, which operate the crane 14 and the tree cutting apparatus 10. A boom 28 is pivotally secured to the overhead assembly 20 about a horizontal axis transverse to the longitudinal axis of the crane. The outer end of the boom 28 pivotally carries the dipper stick 12 which is pivoted thereto about a pivot pin 30.

A hydraulic lift cylinder 32 is pivotally interconnected at one end to the overhead assembly 20 and its other end to the boom 28. The lift cylinder 32 pivots the boom 28 through a vertical plane about the horizontal pivot (not shown) of the boom 28 on the overhead assembly 20. A hydraulic crowd cylinder 34 is pivotally interconnected at one end to the boom 28 and its other end to the dipper stick 12. The crowd cylinder 34 pivots the dipper stick 12 in a vertical plane about the pivot connection 30 between the boom 28 and the dipper stick 12.

Figure 2:
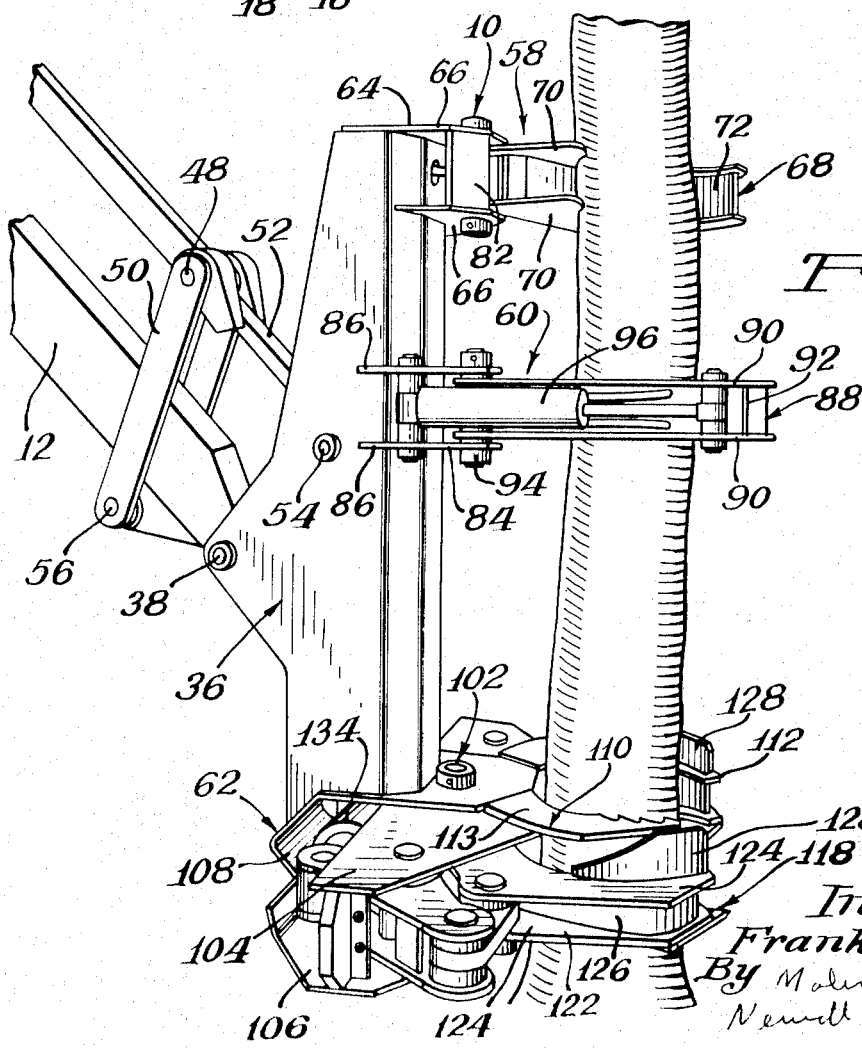
FIG. 2 is an enlarged perspective view of my improved tree cutting apparatus as it engages a tree prior to cutting.

The tree feller 10 includes a normally upright, rigid support member 36. The intermediate rear portion of the upright support 36 is pivotally interconnected to the outer end of the dipper stick 12 at a pivot connection 38. The cylinder end of a hydraulic drive cylinder 40 is pivotally connected to the innermost end and upper side of the dipper stick 12. The outer end of the piston rod 42 of the hydraulic cylinder 40 is pivotally interconnected at its lower end to the dipper stick 12. The outermost end of the connecting bar 46 is pivotally interconnected about a pivot pin 48 which also pivotally carries a second link 50 and an operating link 52. The operating link is pivotally interconnected by pivot 54 to the upright support 36, the pivot point 54 being located above and forward of the pivot connection 38, as seen in FIG. 2. The second link 50 is pivotally connected to a rigid extension at the lower and outer end of the dipper stick 12 about a pivot member 56.

With the foregoing structure, the tree feller 10 may be moved in a variety of directions. By being mounted on the mobile crane 14, the tree feller 10 may be moved 360° about the vertical axis of the turntable 22. The lift cylinder 32 and the crowd cylinder 34 also enable the tree feller 10 to be moved up and down, through rather substantial distances in a vertical plane. The drive cylinder 40 pivots the tree feller 10 in such a way as to move a tree from a vertical position, after cutting, to a horizontal position where the cut tree can be placed adjacent other cut trees.

Also, the tree feller 10 may be used as an attachment on equipment, such as the crane 14, which may be readily used for other purposes, such as for excavation. This is accomplished simply by attachment to outer end of a dipper stick. The operation of the tree feller is under the complete control of an operator located in a cab 26 who has a full, clear view of the equipment during operation.

The tree feller 10 generally has an upper grab arm assembly, generally 58, movably secured to the blade support 36, an intermediate grab arm assembly, 60 generally, also movably connected to the upright support 36, and a lower assembly, generally 62, for engaging and shearing the lower end of a tree.

Referring particularly to FIGS. 2, 3, and 4, the details of the upper grab arm 60 are seen. A rigid frame 64 is secured, as by welding to the upper and outer side of the upright support 36. The frame includes a pair of vertically spaced plates. An arm 68, including upper and lower spaced plates 70 and a normally upright, interconnecting rigid plate 72, is pivotally carried by the frame 64 by use of an upright pivot member 74. The upper and lower plates 70 of the arm 68, as best seen in FIG. 4, have a concave inner periphery for engagement with the normally circular periphery of the outer surface of a tree, as shown in FIG. 2.

A hydraulic drive cylinder and piston arrangement 76 is pivotally connected at one end by a pivot pin 78 to the upper support frame 64. The opposite end of the drive cylinder 76 is pivotally connected between the upper and lower plate 70 of the arm 68 by a pivot member 80.

The arm 68, through the action of the drive cylinder 76, is pivoted about the pin 74 so as to move in and out of engaging relationship with one side of the outer periphery of a tree. In FIG. 4, the arm 58 is shown, in hidden view, in the innermost, tree engaging position. In the applicant's structure, it is important that the upper grab arm 58 be moved inwardly to a defined position. The defined position is determined by a stop member 82 which is secured to the support frame 64. The stop 82 engages the inner edge of the upper and lower plates 70 of the arm 68 as it moves to the inner position. As will be described hereafter, the arm 68 is moved into direct alignment above a portion of the lower assembly 62, before the intermediate grab arm assembly 60 is moved into engagement with the outer periphery of a tree.

The intermediate grab arm assembly 60 is constructed in a manner similar to the upper grab arm assembly 58. A support frame 66 is mounted below the upper frame 64 for the upper grab arm 58. The frame 66 includes vertically spaced support plates 66 which are welded to the upright support 36. The lower arm 88 includes a pair of vertically spaced plates 90 which are rigidly interconnected by an arcuate, upright, rigid plate 92. A pivot member 94 is carried on the support plates 86 for pivotally mounting the arm 88 about a vertical axis. As with the upper arm 68, the lower arm 88, as shown most clearly in FIG. 4, has a concave inner periphery so as to engage the convex outer periphery of a tree.

A hydraulic drive cylinder 96 for the arm 88 is pivotally connected at its cylinder end to the support frame 84 by a pivot member 98. The other end of the drive cylinder 96 is pivotally interconnected by a pin member 100 to the arm 88. The drive cylinder pivots the arm 88 about the pivot 94 which interconnects the arm 88 to the frame 84. The pivot member 94 is directly above the pivot point for the upper arm 68. In contrast to the upper grab arm assembly 68, there is no stop provided for the inward swinging movement of the arm 88 as it is moved into engagement with the outer periphery of a tree. As will be described hereinafter in greater detail, this enables a tree to be maintained under positive control of the operator before, during, and after the cutting operation.

With reference particularly to FIGS. 3, 5, and 6, the lower shear assembly 62 will be described in detail. As viewed in side elevational view, as seen in FIG. 3, the lower assembly 62 includes a rigid support frame 102. The frame 102 is rigidly secured to the lower end of the upright support 36 by a rigid, upper plate member 104. A lower rigid plate 106 is rigidly interconnected to the upper plate 104 by a rear rigid connecting portion 108.

The upper plate 104 has a rigid tree engaging member, generally 110, fixedly secured thereto. The rigid plate 110 is U-shaped as viewed in a plan view and as seen in FIGS. 5 and 6. The rigid U-shaped member 110 includes a pair of forwardly and outwardly projecting arms 112 and 113. Each of the arms 112 and 113 has a toothed, concave inner portion 114 for engaging the convex outer periphery of a tree. The arm 112, which is directly below the upper grab arm 58, cooperates with the upper grab arm 68 to maintain the periphery of the tree in an upright position. When the upper grab arm 68 has been moved to its innermost position where it is stopped by the stop member 82, the arcuate periphery of the upper arm 68 is in direct alignment with the arcuate portion 114 of the arm 112. Thus, as the operator moves the mobile crane 14 into position and engages a tree with the feller 10, the arcuate portion 114 of the rigid member 110 and the arm 68, in the closed position, cooperate to move a tree into a vertical position before, during, and after the cutting operation. Thus, the stop 82 cooperates with the arm 68 and the drive means therefor for aligning the moving arm 68 with the rigid arm portion 112.

A pair of shear members 116 and 118 are pivotally carried between the upper and lower frame plates 104 and 106 by a rigid vertical pin 120 which is carried by the plates 104 and 106. Each shear member generally includes a rigid support member 122 constructed by a pair of vertically spaced plates 124 and a rigid, upright connecting member 126 passing therebetween. The upper plate has an upright guide flange 128, arcuate in shape, which, as shown in FIG. 6, in the closed position, is an extension of the arcuate portions 114 of the arms 112 and 113 so that after a tree has been cut, the arms 112 and 113 cooperate with the flanges 128 to completely confine the cut lower end of a tree so as to rigidly hold it in place.

The underside of the lower of each support plate 124 has a shear blade 132 removably connected thereto. The shear blade 130 comprises a blade having a beveled edge and is removably secured to the plate 124 by bolts 132. It is important in this structure to provide means for readily replacing the shear blades 130 so that the operator of the equipment may readily replace the shear members 130 if they become damaged or become worn during operation. The blades are rigidly confined on all of their non-working sides so as to protect the blades during use and so as to enable the operator to easily remove the used blades 130 and replace them with new ones.

A single hydraulic drive cylinder 134 is mounted in the space between the upper and lower plates 104 and 106 of the lower assembly 62 and is pivotally interconnected by pivot connections 136 and 138 to link members 140 located at opposite sides of the frame 102. Each of the links 140 is pivotally carried about a pin member 142 which is carried by the support frame 102. The outer ends of the links 140 are each pivotally connected to secondary links 144, which in turn, are pivotally connected to secondary links which, in turn, are pivotally interconnected to the shear members 116 and 118 by use of pivot pins 146. The pin members 142 are in substantial alignment with the vertical pin members 120 which pivotally connects the shear members 116 and 118 to the lower support frame.

By the use of a single hydraulic cylinder 134 and the particular geometric arrangement of the links 140 and 144, important advantages result. As fluid pressure is applied to the drive cylinder 134, the opposite ends move outwardly equal distances so that the shear members 114 and 116 will move inwardly, through the action of the links 140 and 144 an equal amount. During the cutting operation, the cutting force applied by the shears 116 and 118 increases as the depth of penetration of the blades 130 into the tree increases. This is a distinct advantage because the force required for severing also increases as the depth of shear penetration increases. The geometric arrangement for the shears and connection thereof to the drive cylinder provides the apparatus with a relatively short power stroke for the drive cylinder since the moment about pin 120 increases as the cylinder ends move outwardly. The arrangement provides an efficient operation because substantially full horsepower of the cylinder is used throughout the severing cycle.

For a full understanding of the invention, a brief description of the operation of the apparatus will be provided. When the operator desires to cut trees, the mobile crane 14 is moved across the ground upon movement of the tracks 18, which are driven by suitable hydraulic motors. The operator then selects the tree which he desires to cut and positions the equipment. This is accomplished by operation of the lift cylinder 32, the crowd cylinder 34, and the tool cylinder 40. The feller 10 is moved into a position so that the support 36 is in a substantially upright position.

The operator adjusts the tree feller 10 until the tree engaging rigid member 110 has its lower, rigid arms 112, 113 substantially encompassing the outer periphery of a standing tree and the shear blades 117 and 118 are in a position as close as possible to the ground, and until the grab arms are at opposite sides of the tree. The operator then, through a master control (not shown), applies hydraulic fluid pressure to the drive cylinder 76 so as to pivot the arm 68 inwardly and against the outer periphery of the tree. The movement of the arm 68 is continued until the stop 82 is reached by the arm 68 or until the tree itself stops movement before the stop is reached. When this occurs, the arm 68 is either in alignment above the rigid arm 112 or slightly offset therefrom, in the event that the arm 68 has not been stopped by the stop 82.

Substantially simultaneously with movement of the upper grab arm 58, pressurized hydraulic fluid is applied to the hydraulic drive cylinder 96 for rotating the intermediate arm 88 inwardly against the outer periphery of the tree. The arm 88 applies pressure at a point intermediate the upper arm 68 and the lower assembly 62. Hydraulic pressure is constantly applied to the cylinders 76 and 96 so that the tree is substantially rigidly locked in place by the cooperation of the upper arm assembly 58, the lower arm assembly 62, and the intermediate grab arm assembly 60.

With the tree locked into position and by automatic diversion of the hydraulic fluid, hydraulic pressure is applied to the shear cylinder 134. Through the links 140 and 144, the shear members 116 and 118 are rapidly driven inwardly towards each other. The shear blades 130 rapidly shear off the tree at its base, the force applied during the cutting operation constantly increasing as the depth of penetration increases. During the cutting operation, the drive cylinder 96 constantly applies pressure to the outer periphery of the tree, and in effect, forcing the tree against the upper grab arm 58 and the rigid tree engaging assembly 110. As soon as the severing is completed, the intermediate arm 60 continues to apply pressure and locks the severed tree and confines it in place to assure its maintenance in a substantially upright position. When the tree is held in the upright position, the operation of moving the tree to a desired location is greatly facilitated and simplified. By the use of the lift cylinder 32 and the crowd cylinder 34, the tree may be lifted to a desired height and the crane 14 may be moved to a location where the tree is set down. Thus, at all times, the tree engaging elements cooperate to maintain the tree under constant and positive control before, during and after the cutting is completed. This result is achieved even when a tree is standing on a slope or is angularly offset from the longitudinal axis of the crane, boom, and dipper stick. After severing, the apparatus automatically forces and maintains the tree in a position parallel to the upright axis of the crane.

The distance between the intermediate grab arm 60 and the upper grab arm 58 and the distance between the intermdiate grab arm 60 and the lower assembly 62 is such that the moment arm between the pressure points rigidly holds the tree in place at all times. The intermediate arm is a substantial distance from the upper grab arm assembly 58 and also from the lower shear assembly 62, preferably one-third of the total distance down from the upper arm assembly 58. The shear blades 130, after the severing is completed, act as a shelf upon which the tree rests while the rigid tree engaging member 110 and the flanges 128 on the shear members 116 and 118 cooperate to rigidly confine the cut lower end of the cut tree.

While in the foregoing, there has been provided a detailed description of a particular embodiment of the present invention, it is to be understood that all equivalents obvious to those having skill in the art are to be included within the scope of the invention as claimed.

What I claim and desire to secure by Letters Patent is:

1. A shear assembly for severing trees and tree-like objects, said assembly comprising, in combination, a support, a first shear member pivotally secured about a first axis on said support, a second shear member pivotally secured to said support about said first axis, said first axis being normally spaced laterally of the axis of said tree or tree-like object, said first and second shear members being pivotable towards and away from each other, a single drive member for imparting a driving force, a pair of link means, each pivotally carried by said support about second fixed axes spaced from each other and on opposite sides of said first axis, and each of said link means being pivotally connected both to said drive member and to said shear members for simultaneously transferring severing motion and force from said drive member to both of said shear members for severing said trees or tree-like objects, and means defined by the relative positions of the pivot axes of said link means on said support and with said drive member and said shear members for changing the various moment arms and for ultimately increasing said driving force in such a way that the severing force of the shear members resulting from the drive member increases as the shear members increase their depth of penetration into said trees or tree-like objects.

2. The apparatus of claim 1 wherein each of said link means includes a first link, pivotally connected to an end of said drive means, and a second link pivotally connected at one of its ends to said first link, and at the other end, to one of said shear members, and said second axis is with said first link.

3. The apparatus of claim 2 wherein the pivot connection of each second link to said support and the pivot connection of said shear members to said support are in substantial alignment, said pivot connection of said shear members being central of a line passing between said second axes.

4. The apparatus of claim 1 wherein said drive means includes a single hydraulic drive cylinder and piston arrangement for operating said shear members.

5. The apparatus of claim 1 wherein said shear members include a support portion and a blade portion, said blade portion being removably secured to said support portion.

* * * * *